United States Patent
Park et al.

(10) Patent No.: US 7,033,697 B2
(45) Date of Patent: Apr. 25, 2006

(54) BATTERY UNIT AND SECONDARY BATTERY EMPLOYING THE SAME

(75) Inventors: Sang-mok Park, Asan (KR); Chan-hee Lee, Busan Metropolitan (KR)

(73) Assignee: Samsung SDI Co., Ltd., Suwon-si (KR)

(*) Notice: Subject to any disclaimer, the term of this patent is extended or adjusted under 35 U.S.C. 154(b) by 264 days.

(21) Appl. No.: 10/214,557

(22) Filed: Aug. 9, 2002

(65) Prior Publication Data

US 2003/0099880 A1 May 29, 2003

(30) Foreign Application Priority Data

Nov. 23, 2001 (KR) ............... 2001-73286

(51) Int. Cl.
- H01M 4/02 (2006.01)
- H01M 2/18 (2006.01)
- H01M 2/26 (2006.01)

(52) U.S. Cl. ............... 429/211; 429/246; 429/233; 429/234; 429/237; 429/244; 429/178; 429/181; 429/146

(58) Field of Classification Search ............... 429/211, 429/246, 233, 234, 237, 244
See application file for complete search history.

(56) References Cited

U.S. PATENT DOCUMENTS 6,251,537 B1 * 6/2001 Kim et al. ............... 429/181

FOREIGN PATENT DOCUMENTS

| JP | 09-288996 | * | 11/1997 |
| JP | 2000-173657 | * | 6/2000 |
| JP | 2000-188115 | * | 7/2000 |
| WO | WO 97/08762 | * | 3/1997 |

* cited by examiner

Primary Examiner—Patrick Joseph Ryan
Assistant Examiner—Angela J. Martin
(74) Attorney, Agent, or Firm—Stein, McEwen & Bui, LLP

(57) ABSTRACT

A battery unit for a secondary battery that includes a positive electrode plate, a positive electrode tab, a negative electrode plate, a negative electrode tab, a separator, and short circuit preventing units, wherein the short circuit preventing units are formed on corresponding uncoated areas of the positive and negative electrode current collectors where the positive and negative electrode sheets are not formed, each short circuit preventing unit having a corresponding width greater than a width of the corresponding positive and negative electrode current collectors.

45 Claims, 6 Drawing Sheets

BATTERY UNIT AND SECONDARY BATTERY EMPLOYING THE SAME

CROSS REFERENCE TO RELATED APPLICATION

This application claims the benefit of Korean Patent Application No. 2001-73286, filed on Nov. 23, 2001 in the Korean Intellectual Property Office, the disclosure of which is incorporated hereinto by reference.

BACKGROUND OF THE INVENTION

1. Field of the Invention

The present invention relates to a secondary battery, and more particularly, to an improved battery unit configured to prevent short circuit or corrosion due to a contact between a case and an electrode plate or between electrode plates, and a secondary battery employing the battery unit.

2. Description of the Related Art

Lithium batteries are capable of charging and discharging and are classified into nickel-cadmium (Ni—Cd) batteries, nickel-hydride (Ni—MH) batteries and lithium secondary batteries. Specifically, the lithium secondary batteries are rapidly developing in view of their high operating voltage of 3.6 V or higher, which is approximately 3 times that of the nickel-cadmium (Ni—Cd) batteries or nickel-hydride (Ni—MH) batteries, and their excellent energy density per unit weight.

The lithium secondary batteries can be classified into liquid electrolyte batteries and solid electrolyte batteries according to the electrolyte used. In general, batteries using a liquid electrolyte are referred to as lithium-ion batteries and batteries using a polymeric electrolyte are referred to as lithium polymer batteries. The lithium secondary batteries can be manufactured in various shapes, typically in cylindrical and rectangular shapes, which are mainly used in lithium ion batteries. Lithium polymer batteries have lately attracted attention since they are manufactured by a flexible material rendering them to be shaped freely. Also, since the lithium polymer batteries have good safety characteristics and are lightweight, they can be advantageously used in miniaturized and lightweight portable electronic devices.

Referring to FIG. 1, a secondary battery 10 includes a battery unit 14 having a positive electrode plate 11 and a negative electrode plate 12. A separator 13 is disposed between the positive and negative electrode plates 11 and 12 and electrically insulates the positive and negative electrode plates 11 and 12. A positive electrode tab 15 and a negative electrode tab 16 are respectively drawn out from the respective electrode plates 11 and 12 of the battery unit 14. A positive electrode terminal 17 and a negative electrode terminal 18 are electrically connected to the positive and negative tabs 15 and 16. A case 19 includes a space 100 in which the battery unit 14 is housed. The case 19 is shaped as a pouch and includes an upper case 19a and a lower case 19b.

The above-described secondary battery 10 is constructed such that the battery unit 14 having the positive electrode plate 11, the separator 13 and the negative electrode plate 12 are sequentially stacked and mounted in the pouch-shaped case 19. In order to fabricate the stack-type battery unit 14, the positive and negative plates 11 and 12 with the separator 13 interposed therebetween must be laminated several times to complete a unit cell, and a plurality of unit cells must be stacked. This approach, however, limits continuous mass production. Also, in the course of cutting the unit cell to be stacked, a short circuit may occur due to burrs generated at ends of the positive and negative electrode plates 11 and 12, resulting in severe deterioration of the completed battery.

To overcome the shortcomings of the above mentioned stack-type battery unit, a fabrication method has been recently adopted, in which a positive electrode plate 11, a negative electrode plate 12, and a separator 13, interposed between the positive and negative plates, are each formed into a foil, and the positive electrode plate 11, the separator 13, and the negative electrode plate 12 are sequentially arranged and wound to then be mounted in the pouch-shaped case 19. FIG. 2 is a front view of an electrode plate 20 of such a battery unit, and FIG. 3 is a rear view of the electrode plate 20.

Referring to FIGS. 2 and 3, the electrode plate 20 includes a current collector 21 and electrode sheets formed on both surfaces of the current collector 21. The electrode sheets are a front electrode sheet 22 and a rear electrode sheet 23 formed on the front and rear surfaces of the current collector 21, respectively. In the current collector 21, an area is provided where the front and rear electrode sheets 22 and 23 are not coated, called an uncoated area. The uncoated area includes a front electrode uncoated area 24 and a rear electrode uncoated area 25 formed on the front and rear surfaces of the current collector 21, respectively. An electrode tab 26 is welded to the rear electrode uncoated area 25. A portion of the electrode tab 26 is wrapped with a protective tape 27. One or more insulating tapes 28 are adhered to a boundary between the front electrode sheet 22 and the front electrode uncoated area 24 and between the rear electrode sheet 23 and the rear electrode uncoated area 25, respectively.

In the above-described electrode plate 20, the insulating tapes 28 have the same width as the width of the current collector 21, and are selectively adhered to the front or rear surfaces of the current collector 21.

The insulating tapes 28 are required to protect a portion where the electrode plate 20 and the electrode tab 26 are electrically connected to each other and prevent short circuits due to a contact between opposite electrode plates. The mechanism to prevent short circuits is formed at a portion where the electrode tab 26 is installed, and at boundaries between the front electrode sheet 22 and the front electrode uncoated area 24 and between the rear electrode sheet 23 and the rear electrode uncoated area 25. Thus, short circuits due to a contact between electrode plates 11 and 12 can be prevented during operation of the secondary battery. The conventional secondary battery poses some limitations.

The width of the insulating tape 28 is the same as that of the current collector 21, and the insulating tape 28 is not formed in the front electrode uncoated area 24. Accordingly, if a separator 13 interposed between electrode plates 11 and 12 undergoes deformation such as shrinkage, during operation of the battery, the electrode plates 11 and 12 may contact each other, resulting in a short circuit.

Also, in the pouch-shaped battery case 19, having a multi-layer structure, a short circuit may occur at a medium layer made of metal that becomes exposed when an inner layer as an insulation layer is damaged and causes a contact between two electrode plates 11 and 12 of a wound battery unit. Also, if there is a contact between an electrode plate and a medium layer of the pouch-shaped battery case 19, for example, if a current collector made of a copper foil is electrically connected to a medium layer made of an aluminum foil, the pouch-shaped battery case 19 gradually corrodes depending on a difference in ionization level between the current collector and the medium layer. Therefore, there is a demand for secondary batteries designed to have a mechanism to prevent short circuits.

SUMMARY OF THE INVENTION

It is an object of the present invention to provide a battery unit having the improved capacity to prevent short circuits, wherein the battery unit selectively adheres to the front and rear surfaces of a current collector to prevent a short circuit or corrosion between electrode plates or between an electrode plate and a case.

Additional objects and advantages of the invention will be set forth in part in the description which follows and, in part, will be obvious from the description, or may be learned by practice of the invention.

In order to accomplish the above and other objects, according to an embodiment of the present invention, a battery unit for a secondary battery comprises a positive electrode plate having a positive electrode current collector and a positive electrode sheet that is selectively formed on both surfaces of the positive electrode current collector, a positive electrode tab electrically connected to the positive electrode current collector and having a protective tape wrapped around its portion protruding outside from the positive electrode current collector, a negative electrode plate having a negative electrode current collector and a negative electrode sheet that is selectively formed on both surfaces of the negative electrode current collector, a negative electrode tab that is electrically connected to the negative electrode current collector and having a protective tape wrapped around a portion protruding outside from the negative electrode current collector, a separator that is interposed between the positive electrode plate and the negative electrode plate, and a plurality of short circuit preventing units selectively formed on positive and negative electrode uncoated areas of the positive and negative electrode current collectors where the positive and negative electrode sheets are not formed, wherein the short circuit preventing units have widths relatively greater than widths of the positive and electrode current collectors.

Also, the positive electrode tab is, according to one aspect of the present invention, fixedly welded to either a front surface or a rear surface of the positive uncoated areas, and an area where the positive electrode tab is exposed is between the protective tape wrapped around the positive electrode tab and the positive electrode current collector.

Furthermore, one of the short circuit preventing units is according to another aspect of the present invention, adhered to the top surface of an area where the positive electrode tab is formed.

The first short circuit preventing unit includes according to a further aspect of the present invention, a width sufficient to cover both the positive electrode current collector and an area where the positive electrode tab is exposed, wherein the area ranges from the upper end of the positive electrode current collector to the lower end of the protective tape wrapped around the positive electrode tab.

Alternatively, according to yet another aspect of the invention, one of the short circuit preventing units is further included in the positive uncoated area formed on the rear surface of the positive electrode current collector having the positive electrode tab.

One of the short circuit preventing units, according to another aspect of the present invention has a width sufficient to cover both the positive electrode current collector and an area where the positive electrode tab is exposed, wherein the area ranges from the upper end of the positive electrode current collector to the lower end of the protective tape wrapped around the positive electrode tab.

Also, one of the short circuit preventing units, according to one aspect of the present invention has a length sufficient to cover both one edge of the positive electrode current collector to a boundary between the positive electrode uncoated area and the positive electrode sheet.

Furthermore, the negative electrode tab is, according to one aspect of the present invention, fixedly welded to either a front surface or a rear surface of the negative uncoated areas, and an area where the negative electrode tab is exposed is formed between the negative tape wrapped around the negative electrode tab and the negative electrode current collector.

According to another aspect of the present invention, one of the short circuit preventing units is at the top surface of an area where the negative electrode tab is formed.

One of the short circuit preventing units, in a further aspect of the present invention, has a width sufficient to cover both the negative electrode current collector and an area where the negative electrode tab is exposed, wherein the area ranges from the upper end of the negative electrode current collector to the lower end of the protective tape wrapped around the negative electrode tab.

One of the short circuit preventing units is formed, in yet another aspect of the present invention, on the negative electrode uncoated area formed on the rear surface of the negative electrode current collector having the negative electrode tab.

According to a different embodiment of the present invention, a secondary battery including a battery unit comprises a positive electrode plate, a separator and a negative electrode plate sequentially disposed to be wound, a positive electrode tab electrically connected to the positive electrode plate and which has a protective tape wrapped around a portion protruding outside from the positive electrode plate, a negative electrode tab selectively connected to the negative electrode plates and which has a protective tape wrapped around a portion protruding outside from the negative electrode plate, and a case having a space in which the battery unit is housed upon being wound, wherein the positive electrode plate has a positive electrode current collector and a positive electrode sheet selectively formed on both surfaces of the positive electrode current collector, the negative electrode plate has a negative electrode current collector and a negative electrode sheet selectively formed on the surfaces of the negative electrode current collector, and a plurality of short circuit preventing units are selectively formed on positive and negative electrode uncoated areas of the positive and negative electrode current collectors where the positive and negative electrode sheets are not formed, wherein the short circuit preventing units have widths relatively greater than widths of the positive and electrode current collectors.

The plurality of short circuit preventing units, according to one aspect of the present invention, have widths sufficient to cover both the positive and negative electrode current collectors and areas where the positive and negative electrode tabs are exposed, wherein the areas range from the upper ends of the positive and negative electrode current collector to the lower ends of the corresponding protective tapes wrapped around the positive and negative electrode tabs.

BRIEF DESCRIPTION OF THE DRAWINGS

These and other objects and advantages of the invention will become apparent and more readily appreciated from the following description of the embodiments, taken in conjunction with the accompanying drawings of which.

DETAILED DESCRIPTION OF THE EMBODIMENTS

Figure 1:
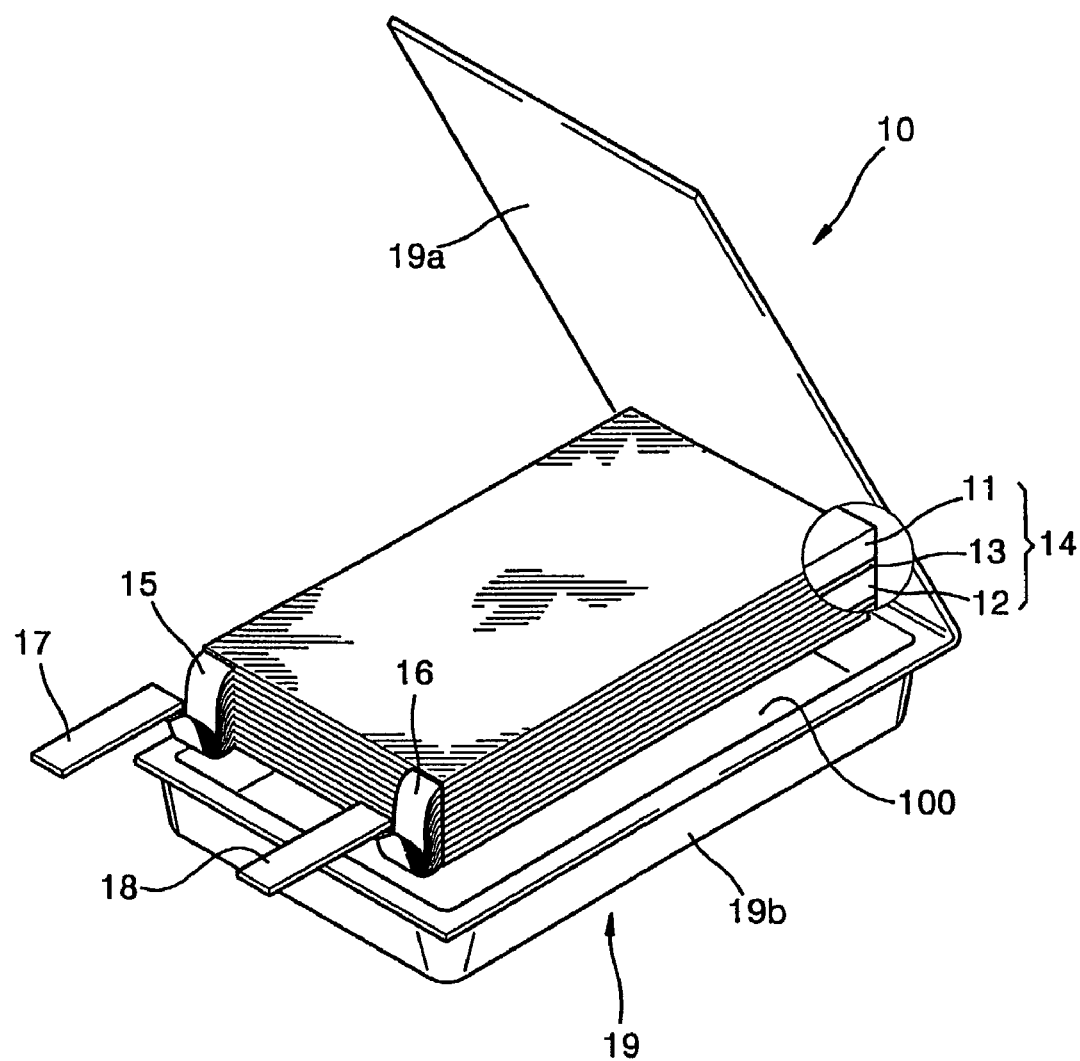
FIG. 1 is an extracted perspective view of a conventional secondary battery.
Figure 2:
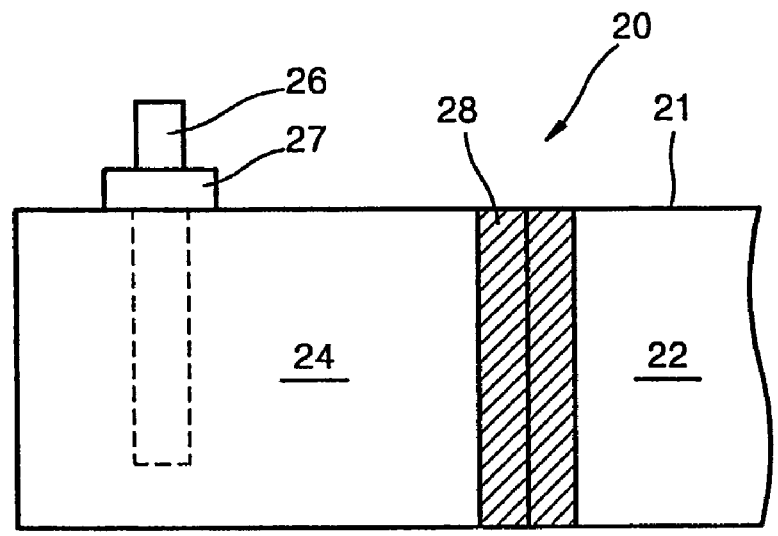
FIG. 2 is a front view partially showing an electrode plate of a battery unit of the conventional secondary battery shown in FIG. 1.
Figure 3:
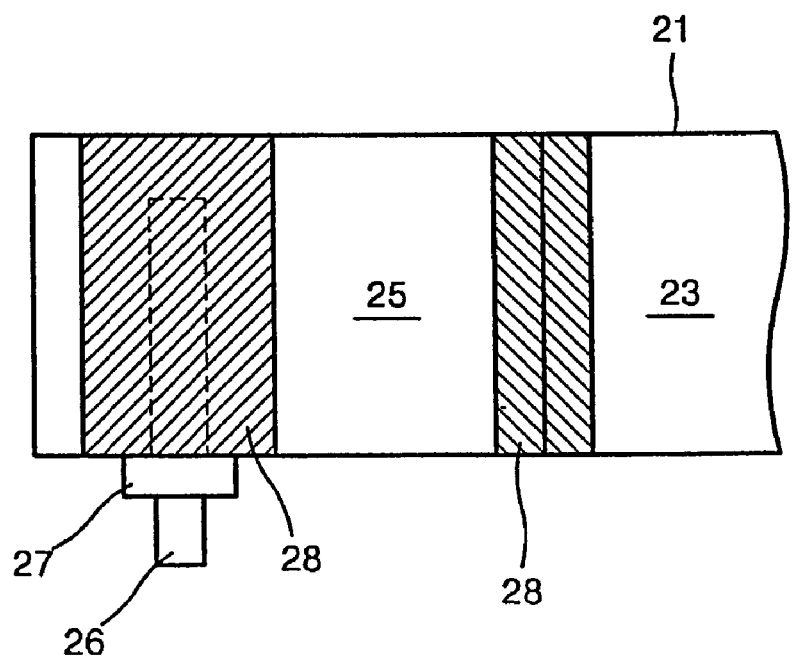
FIG. 3 is a rear view of the electrode plate shown in FIG. 2.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 4:
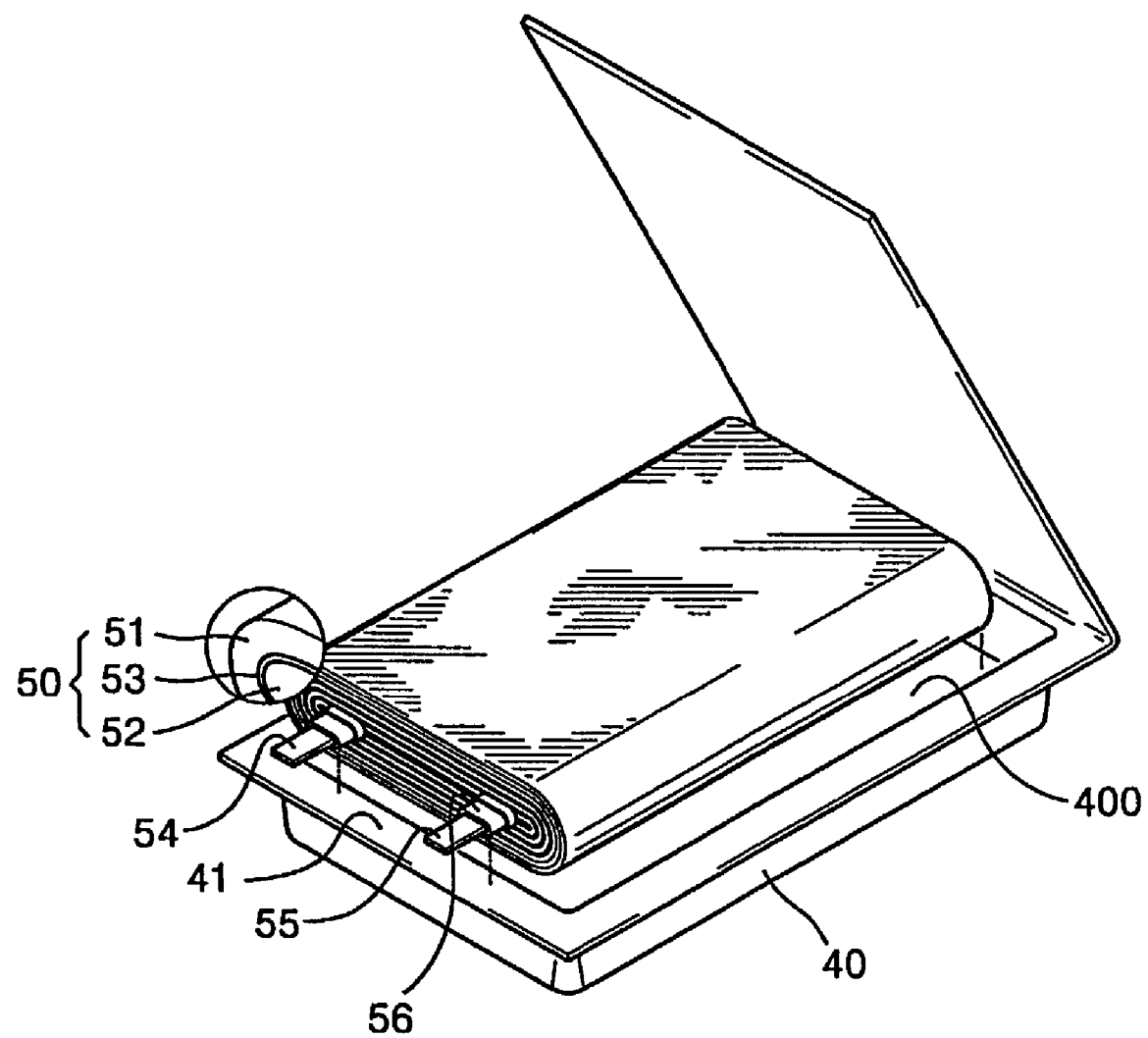
FIG. 4 is an extracted perspective view of a secondary battery according to an embodiment of the present invention.

FIG. 4 shows a secondary battery according to an embodiment of the present invention. Referring to FIG. 4, the secondary battery comprises a battery unit 50, and a case 40 in which the battery unit 50 is housed. The battery unit 50 comprises a positive electrode plate 51, a negative electrode plate 52 and a separator 53 interposed therebetween for isolation. The battery unit 50 is wound like a jelly-roll since the positive electrode plate 51, the separator 53 and the negative electrode plate 52 are sequentially disposed. A positive electrode tab 54 and a negative electrode tab 55 are electrically connected to the positive and negative electrode plates 51 and 52, respectively. A protective tape 56 is wrapped around the outer surfaces of each of the positive and negative electrode tabs 54 and 55. The protective tape 56 is provided to increase the sealing efficiency at contact areas between the positive and negative electrode tabs 54 and 55 and a sealed surface 41 of the case 40 during heat fusion after the battery unit 50 is housed in a space 400 of the case 40.

Figure 5:
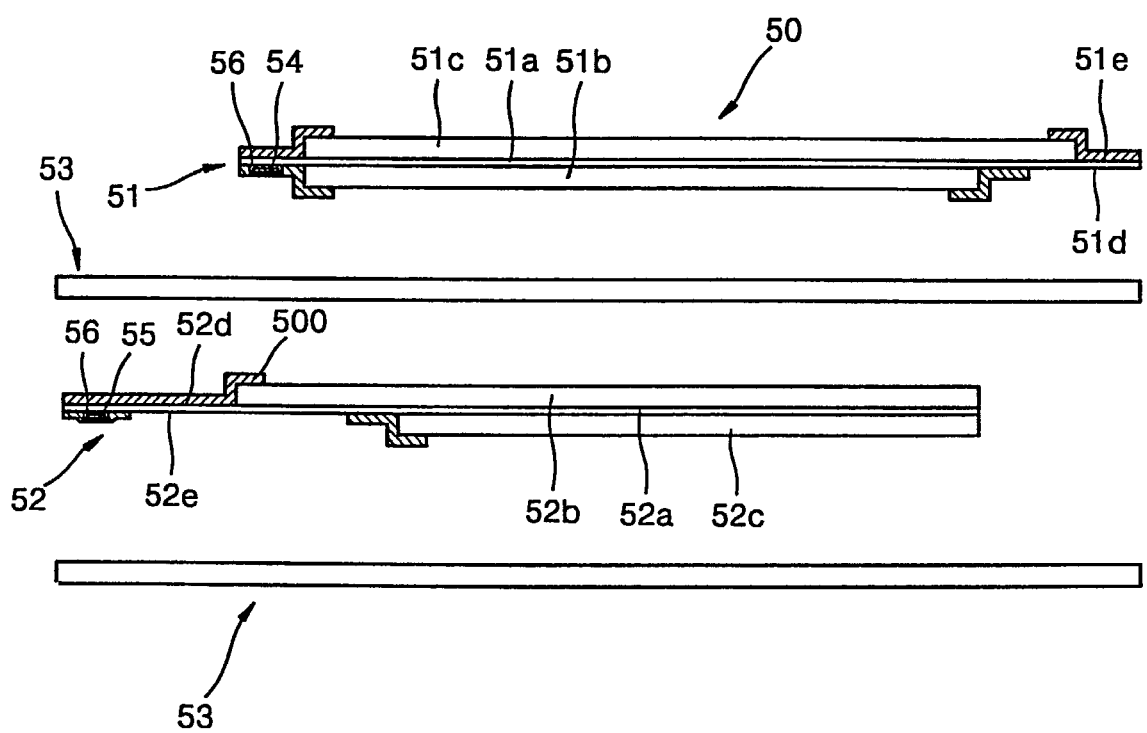
FIG. 5 is a partly extracted plan view of a battery unit of the secondary battery shown in FIG. 4.

One of the features of the present invention is that a short circuit preventing unit to prevent short circuits between the positive and electrode plates 51 and 52 and short circuits at portions where the positive and negative electrode tabs 54 and 55 and the case 40 contact is installed in the battery unit 50, which will later be described in detail. FIG. 5 is a partly extracted plan view of a battery unit 50 of the secondary battery shown in FIG. 4. Referring to FIG. 5, the battery unit 50 comprises a positive electrode plate 51, a negative electrode plate 52 and a separator 53 interposed between the positive and negative electrodes 51 and 52. While only one separator 53 is shown, it is understood that multiple separators 53 can be used in between positive electrode plate 51 and negative electrode plate 52.

The positive electrode plate 51, according to one aspect of the present invention, includes a positive electrode current collector 51a, wherein the positive electrode current collector 51a is made of a metal foil, and a front positive electrode sheet 51b and a rear positive electrode sheet 51c mainly comprise a positive electrode active material coated on both surfaces of the positive electrode current collector 51a. The negative electrode plate 52 includes a negative electrode current collector 52a made of a metal foil, and a front negative electrode sheet 52b and a rear negative electrode sheet 52c mainly comprising a negative electrode active material coated on both surfaces of the negative electrode current collector 52a. An additional separator 53 is disposed on the rear negative electrode sheet 52c.

According to a different aspect of the present invention, an aluminum foil is used as the positive electrode current collector 51a, and a copper foil is used as the negative electrode current collector 52a for the lithium battery. The front and rear positive electrode sheets 51b and 51c comprise a positive electrode active material such as lithium-based oxide, a binder, a conductive material and a plasticizer. The front and rear negative electrode sheets 52b and 52c comprise negative electrode active materials selected from the group consisting of carbon material, a binder and a plasticizer. However, it is understood that the collectors 51a, 52a, and the active materials can be other materials known or later developed.

A positive electrode tab 54 is attached to the positive electrode plate 51, and a negative electrode tab 55 is attached to the negative electrode plate 52. Each protective tape 56 has a predetermined width and is wrapped around the outer surfaces of the positive and negative electrode tabs 54 and 55. The function of the protective tape 56 is the same as described above, and an explanation thereof will not be repeated.

In the positive electrode current collector 51a includes an area where the front and rear positive electrode sheets 51b and 51c are not formed. The area where the front and rear positive electrode sheets 51b and 51c are not formed is called a positive electrode uncoated area. The positive electrode uncoated area includes a front positive electrode uncoated area 51d and a rear positive electrode uncoated area 51e formed on the front and rear surfaces of the positive electrode current collector 51a, respectively. No reaction between electrodes 51 and 52 takes place in the front and rear positive electrode uncoated areas 51d and 51e. The front and rear positive electrode uncoated area 51d and 51e are selectively formed at the portion thereof to which the positive electrode tab 54 is attached as shown, but can also be formed in other areas. The positive electrode tab 54 is welded to the front positive electrode uncoated area 51d and electrically connects the positive electrode tab 54 and the front positive electrode uncoated area 51d.

The negative electrode current collector 52a includes an area where the front and rear negative electrode sheets 52b and 52c are not formed, called a negative electrode uncoated area. The negative electrode uncoated area includes a front negative electrode uncoated area 52d and a rear negative electrode uncoated area 52e formed on the front and rear surfaces of the negative electrode current collector 52a, respectively. The negative electrode tab 55 is fixed to the rear negative electrode uncoated area 52e by welding.

According to one aspect of the present invention, each short circuit preventing unit is formed on the positive and negative electrode uncoated areas. The short circuit preventing unit prevents short circuits, which otherwise can result from a contact between the positive and negative electrode plates 51 and 52 when the separator 53 shrinks during operation of the battery.

According to yet a further aspect of the present invention, the short circuit preventing unit is an insulating tape 500 made of a polymer resin having high heat resistance, such as polyester or polyimide.

Figure 6:
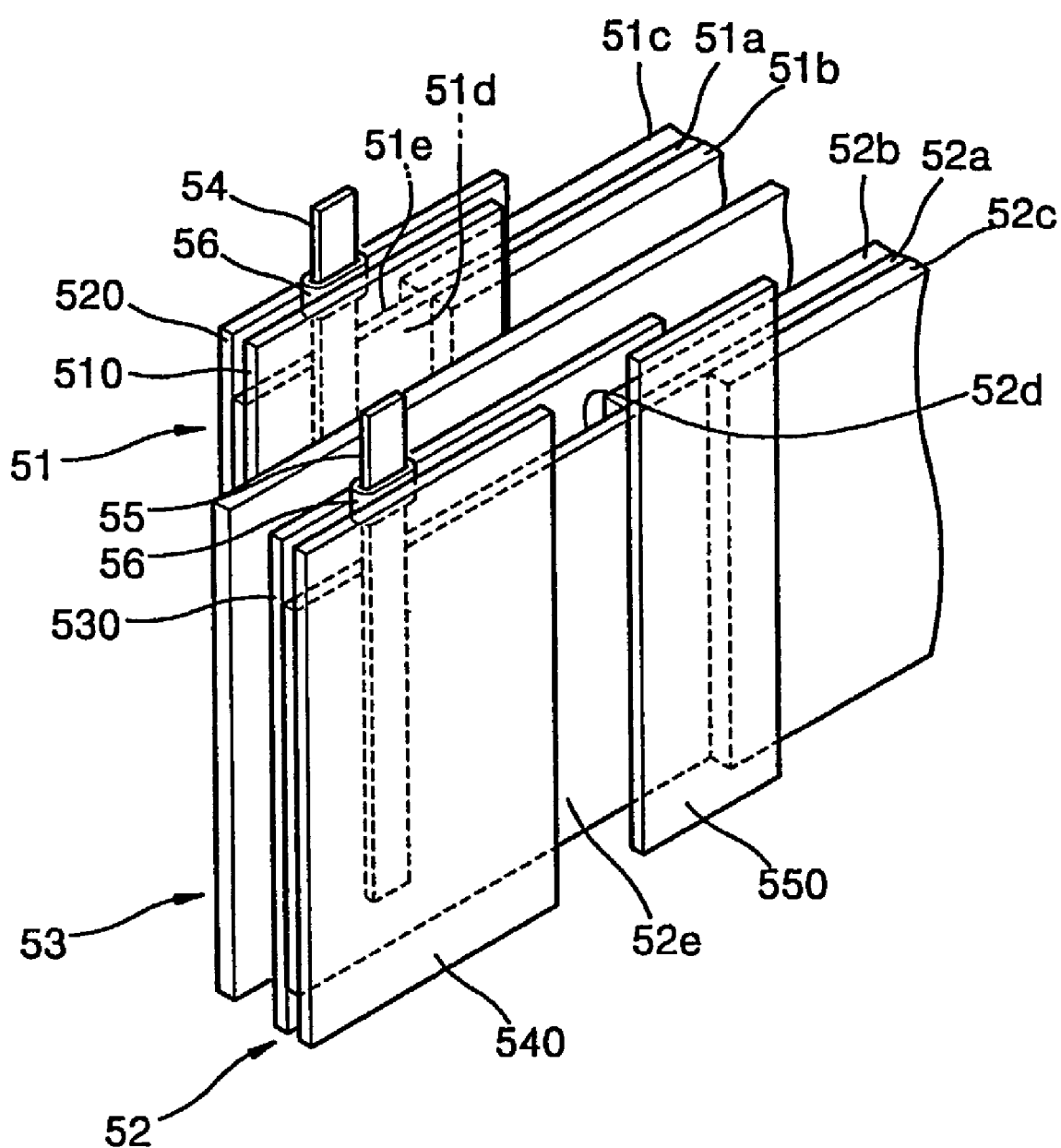
FIG. 6 is a partly extracted perspective view of the battery unit shown in FIG. 5.

FIG. 6 is a partly extracted perspective view showing the left side of the battery unit 50 shown in FIG. 5. Referring to FIG. 6, the front and rear positive electrode sheets 51*b* and 51*c* are selectively formed on both surfaces of the positive electrode current collector 51*a* in the positive electrode plate 51. Also, the positive electrode plate 51 includes the front and rear positive electrode uncoated areas 51*d* and 51*e*, which are defined by areas on which the positive electrode sheets 51*b* and 51*c* are not formed on corresponding portions of the positive electrode current collector 51*a*. The positive electrode tab 54 is fixedly welded to the front positive electrode uncoated area 51*d*, and the protective tape 56 is wrapped around a portion of the positive electrode tab 54 that protrudes outside the positive electrode current collector 51*a*.

The front and rear negative electrode sheets 52*b* and 52*c* are selectively formed on both surfaces of the negative electrode current collector 52*a* in the negative electrode plate 52, similar to electrode sheets 51*c* and 51*d* on the positive electrode plate 51. Also, the front and rear negative electrode uncoated areas 52*d* and 52*e* are formed on portions of the negative electrode current collector 52*a*. The negative electrode tab 56 is fixedly welded to the rear negative electrode uncoated area 52*e*.

Here, a plurality of insulating tapes, inclusive of current collector portions where electrode sheets 51*b*, 51*c*, 52*b*, 52*c* are not formed, are attached to the positive and negative electrode plates 51 and 52 for the purpose of preventing short circuits between the positive and negative electrode plates 51 and 52.

According to one aspect of the present invention, a first insulating tape 510 is attached to a portion of the front positive electrode uncoated area 51*d* where the positive electrode tab 54 is formed. The first insulating tape 510 is formed so as to completely cover an area ranging from one edge of the positive electrode current collector 51*a* to a boundary between the front positive electrode sheet 51*b* and the front positive electrode uncoated area 51*d*. Also, the width of the first insulating tape 510 is relatively greater than that of the positive electrode current collector 51*a* so as to cover a part of the positive electrode tab 54. Here, the widths of the plurality of insulating tapes, inclusive of the first insulating tape 510, are greater than the widths of the positive and negative electrode current collectors 51*a* and 52*a*, which will later be described in detail with reference to FIGS. 7 and 8.

A second insulating tape 520 is attached to the rear positive electrode uncoated area 51*e*. Like the first insulating tape 510, the second insulating tape 520 is formed so as to completely cover an area ranging from one edge of the positive electrode current collector 51*a* to a boundary between the rear positive electrode sheet 51*c* and the rear positive electrode uncoated area 51*e*.

An insulating tape is selectively attached to the negative electrode plate 52, according to yet a further aspect of the present invention. Specifically, a third insulating tape 530 is attached to the front negative electrode uncoated area 52*d*. The third insulating tape 530 is formed so as to completely cover an area ranging from one edge of the negative electrode current collector 52*a* to a boundary between the front negative electrode sheet 52*b* and the front negative electrode uncoated area 52*d*.

A fourth insulating tape 540 is attached to a portion of the rear negative electrode uncoated area 52*e* where the negative electrode tab 55 is formed. The fourth insulating tape 540 is formed so as to completely cover an area ranging from one edge of the negative electrode current collector 52*a* and a portion to which the negative electrode tab 55 is fixedly welded.

In the rear negative electrode uncoated area 52*e*, a fifth insulating tape 550 is attached to a portion spaced a predetermined distance apart from the fourth insulating tape 540. The fifth insulating tape 550 is formed so as to completely cover an area ranging from a portion adjacent to the fourth insulating tape 540 to a boundary between the rear negative electrode sheet 52*c* and the rear negative electrode uncoated area 52*e*. While fourth and fifth insulating tapes 540 and 550 are disposed a predetermined distance apart, it is understood that the insulating tapes 540 and 550 could be combined as a single tape or be disposed abutting each other such that no gap exists there between.

According to one aspect of the present invention, the rear negative electrode uncoated area 52*e* where the fourth and fifth insulating tapes 540 and 550 are not formed is an area where there is no contact between electrode plates. In some cases, the fourth and fifth insulating tapes 540 and 550 may be incorporated.

Figure 7:
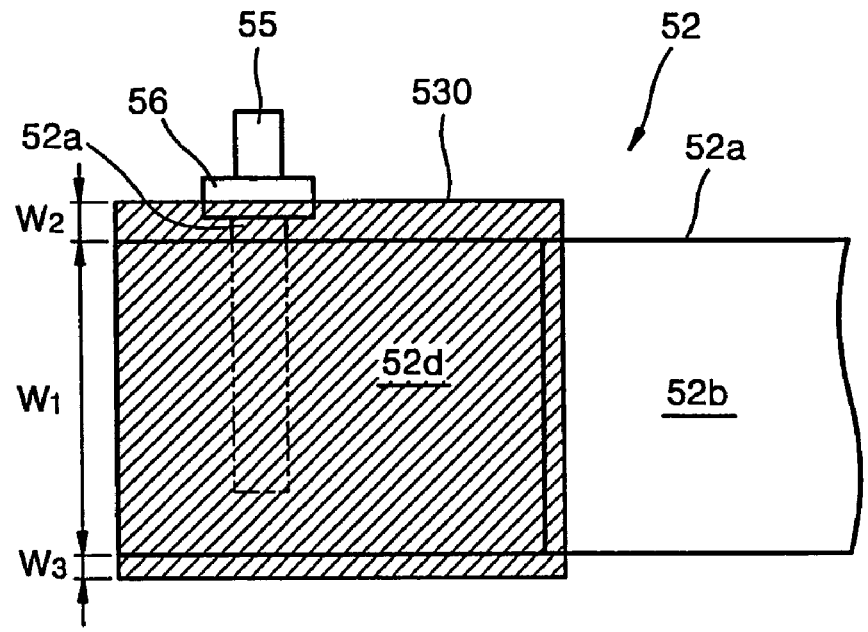
FIG. 7 is a front view partially showing of a negative electrode plate shown in FIG. 6.
Figure 8:
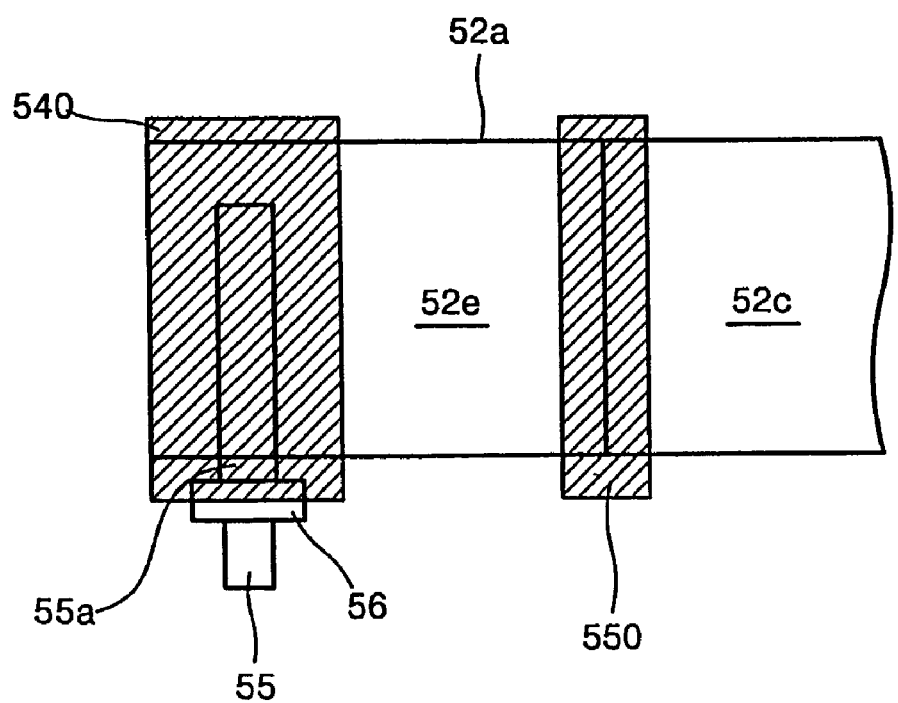
FIG. 8 is a rear view partially showing the negative electrode plate shown in FIG. 6.

FIG. 7 is a front view partially showing of the negative electrode plate 52 shown in FIG. 6, and FIG. 8 is a rear view partially showing the negative electrode plate shown 52 in FIG. 6. Referring to FIGS. 7 and 8, the front and rear negative electrode sheets 52 and 52*c* are formed on both surfaces of the negative electrode current collector 52*a* of the negative electrode plate 52. Also, the negative electrode plate 52 includes the front and rear negative uncoated areas 52*d* and 52*e*, which are defined by areas on which the front and rear negative electrode sheets 52*b* and 52*c* are not formed on corresponding portions of the negative electrode current collector 52*a*.

The third insulating tape 530 is attached to the opposite side of the negative electrode tab 55, according to another aspect of the present invention. As described above, the third insulating tape 530 is large enough to completely cover an area ranging from one edge of the negative electrode current collector 52*a* to a boundary between the front negative electrode sheet 52*b* and the front negative electrode uncoated area 52*d*. The fourth insulating tape 540 is attached to a portion of the rear negative electrode uncoated area 52*e* where the negative electrode tab 55 is formed. The fifth insulating tape 550 is attached to a portion spaced a predetermined distance apart from the rear negative electrode uncoated area 52*e*. The widths of the third through fifth insulating tapes 530–550 are relatively greater than the width of the negative electrode current collector 52*a*.

The negative electrode tab 55 is fixed to the rear negative electrode uncoated area 52*e*, and is then electrically connected to the negative electrode current collector 52. The negative electrode tab 55 partially protrudes outside in a width direction of the negative electrode current collector 52*a*. The protective tape 56 is wrapped around the outer surface of the protruded part of the negative electrode tab 55 in order to improve the sealing efficiency of the sealed surface 41 when mounted in the case 40. In this case, there is an area 55*a* where the negative electrode tab 55 is exposed between the upper end of the negative electrode current collector 52*a* and the lower end of the protective tape 56 wrapped around the negative electrode tab 55, which is largely attributable to common use of components or to facilitate assembly work.

The third and fourth insulating tapes 530 and 540 are of sufficient width to embrace widths of the front and rear negative electrode uncoated areas 52d and 52e. Specifically, the widths include a width W1 of the negative electrode current collector 52a and a width W2 of the area 55a where the negative electrode tab 55 is exposed between the upper end of the negative electrode current collector 52a and the lower end of the protective tape 56 wrapped around the negative electrode tab 55. Also, in order to prevent short circuits between electrode plates or between an electrode plate and a case, the insulating tapes 530 and 540 extend from a side opposite to the exposed side of the negative electrode tab 55 by a predetermined length W3. However, this length W3 is not required in alternate aspects of the invention. Accordingly, the widths (W1+W2+W3) of the third and fourth insulating tapes 530 and 540 are relatively greater than the width W1 of the negative electrode current collector 52a. According to yet a further aspect of the present invention, the width of the fifth insulating tape 550 is the same as each of the widths of the third and fourth insulating tapes 530 and 540.

The widths of the third and fourth insulating tapes 530 and 540 are relatively greater than the width of the negative electrode current collector 52a to perfect sealing of the exposed area 55a between the upper end of the negative electrode current collector 52a and the lower end of the protective tape 56.

The exposed area 55a of the negative electrode tab 55 is a portion that contacts the inner surface of the case when the negative electrode tab 55 is drawn outside the case during battery fabrication. A pouch-shaped case is generally constructed in a multi-layer structure and includes an inner layer made of a polymer resin, a medium layer made of a metal foil and an outer layer made of a polymer resin. However, other constructions are possible.

The exposed area 55a is, according to one aspect of the present invention, the medium layer exposed when the inner layer having an insulating property is damaged (i.e., a layer capable of directly contacting the aluminum (Al) foil). The third and fourth insulating tapes 530 and 540 can insulate the exposed area 55a from the sealed surface of the case. Also, the third and fourth insulating tapes 530 and 540 can prevent short circuits due to burr occurring at the edge of the negative electrode tab 55.

The fifth insulating tape 550, according to a further aspect of the present invention, prevents the negative electrode plate 52 from contacting the positive electrode plate 51 (see FIG. 6), which occurs due to deformation (e.g., shrinkage) of the separator 53 interposed between the electrode plates 51 and 52.

The process of manufacturing the above-described battery unit of the secondary battery according to one aspect of the present invention will be described with reference to FIGS. 4 through 6.

The positive electrode plate 51 is provided with one positive electrode current collector 51a, and both surfaces of the positive electrode current collector 51a are selectively coated with the corresponding front and rear positive electrode sheets 51b and 51c. The negative electrode plate 52 is also provided with one negative electrode current collector 52a, and both surfaces of the negative electrode current collector 52a are selectively coated with the corresponding front and rear negative electrode sheets 52b and 52c. Also, the separator 53 is interposed between the positive and negative electrode plates 51 and 52.

According to one aspect of the present invention, one or more front and rear positive electrode uncoated areas, 51d and 51e of FIG. 6, where the front and rear positive electrode sheets 51b and 51c are not formed, are formed on both surfaces of the positive electrode current collector 51a of the positive electrode plate 51. The positive electrode tab 54 is fixedly welded to the front positive electrode uncoated area 51d, and the protective tape 56 is wrapped around the positive electrode tab 54. Also, one or more front and rear negative electrode uncoated areas 52d and 52e of FIG. 6, where the front and rear negative electrode sheets 52b and 52c are not formed, are formed on both surfaces of the negative electrode current collector 52a of the negative electrode plate 52. The negative electrode tab 55 is wrapped with the protective tape 56 and is fixedly welded to the rear negative electrode uncoated area 52e.

According to one aspect of the present invention, in order to prevent short circuits between the positive and negative electrode plates 51 and 52 and the case 40 and in order to prevent corrosion due to a contact between the case 40 and either electrode plates 51 or 52 or between electrode plates 51 and 52, a plurality of insulating tapes 500 are adhered to the surfaces of positive and negative plate uncoated areas.

According to a further aspect of the present invention, the insulating tapes 500 are selectively adhered to the front and rear positive electrode uncoated areas 51d and 51e and to the front and rear negative electrode uncoated areas 52d and 52e, formed on the positive and negative electrode current collectors 51a and 52a, respectively. In particular, the insulating tapes 500 are adhered to portions of the positive and negative electrode uncoated areas 51d and 52e having the positive and negative electrode tabs 54 and 55 adhered thereto. The insulating tapes 500 cover both portions of the positive and negative electrode current collectors 51a and 52a and portions of the positive and negative electrode tabs 54 and 55 exposed to the lower end of the protective tapes 56 wrapped around the positive and negative electrode tabs 54 and 55 protruding toward upper ends of the positive and negative electrode current collectors 51a and 52a.

According to yet a further aspect of the present invention, after the battery unit 50 comprising the positive electrode plate 51, the separator 53, the negative electrode plate 52, and the separator 53 sequentially disposed, is fabricated, the battery unit 50 is wound in a jellyroll type. The completed battery unit 50 is housed in a case such as in the case 40 shown in FIG. 4, and the sealed surface 52a of the case 52 is fused by heat, thereby completing the manufacture of a battery.

According to one aspect of the present invention the positive and negative electrode tabs 54 and 55, whose ends are electrically connected to external terminals, extend outward, and are in contact with the sealed surface 52a of the case 40. For the purpose of insulating, the plurality of insulating tapes 500 are adhered to the lower ends of the positive and negative electrode tabs 54 and 55, and specifically, adhered to areas where the positive and negative electrode tabs 54 and 55 are exposed. The areas range from the lower ends of the protective tapes 56 to the upper ends of the positive and negative electrode current collectors 51a and 52a.

When multiple layers are used, if the medium layer made of a metal foil is exposed when the inner layer having an insulating property is broken, the metal foil and the exposed areas of the positive and negative electrode tabs 54 and 55 come into contact, resulting in a short circuit therebetween.

Also, if the metal foil of the case 40 contacts an exposed portion of either the positive electrode tab 54 or the negative electrode tab 55, the metal foil is vulnerable to continuous corrosion due to a difference in oxidation potential between the metal foil and the electrode tab in the event of infiltration of an electrolytic solution impregnated into the case 40. Also, if the battery 50 having the positive electrode plate 51, the separator 53 and the negative electrode plate 52 sequentially disposed, is wound, the positive electrode plate 51 and the negative electrode plate 52 may contact each other due to shrinkage of the separator 53, resulting in a short circuit therebetween. The short circuit or corrosion, according to one aspect of the present invention, can be prevented by employing the insulating tapes 500 adhered to a plurality of uncoated areas formed on the positive and negative electrode plates 51 and 52.

As described above, the battery unit according to the present invention and the secondary battery employing the battery unit have numerous advantages. Due to the insulating tapes adhered to the positive and negative electrode tabs respectively fixedly welded to the positive and negative electrode current collectors, it is possible to prevent short circuits or corrosion due to a contact between a metal foil of a case and an exposed portion of an electrode tab, where the contact occurs when the inner insulating layer of the case fails. The insulating tapes are adhered to a plurality of electrode uncoated areas where front and rear electrode sheets are not selectively formed on positive and negative electrode plates, so that the positive and negative electrode plates are not directly connected to each other even when a separator is dissolved or shrinks due to abnormal operation of a battery. Thus, enhanced stability and reliability of the battery can be ensured. Since the insulating tapes are adhered to positive and negative electrode tabs, portions where the positive and negative electrode tabs are fused to the case, can be prevented from deteriorating due to external shock of the battery. Accordingly, the positive and negative electrode tabs can be prevented from being separated from the case.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A battery unit for a secondary battery comprising:
    a positive electrode plate having a positive electrode current collector, and positive electrode sheets selectively formed on surfaces of the positive electrode current collector;
    a positive electrode tab electrically connected to the positive electrode current collector and a protective tape wrapped around a portion protruding from the positive electrode current collector;
    a negative electrode plate having a negative electrode current collector and negative electrode sheets selectively formed on surfaces of the negative electrode current collector;
    a negative electrode tab electrically connected to the negative electrode current collector and a protective tape wrapped around a portion protruding from the negative electrode current collector;
    a separator interposed between the positive electrode plate and the negative electrode plate; and
    short circuit preventing units selectively formed on corresponding uncoated areas of the positive and negative electrode current collectors where the positive and negative electrode sheets are not formed, each short circuit preventing unit having a corresponding width greater than a width of the corresponding positive and negative electrode current collectors so as to cover at least a portion of the corresponding protective tape.

2. The battery unit of claim 1, wherein:
    the positive electrode tab is fixedly welded to either a front surface or a rear surface of the positive uncoated areas, and
    an area where the positive electrode tab is exposed is formed between the protective tape wrapped around the positive electrode tab and the positive electrode current collector.

3. The battery unit of claim 2, wherein:
    one of the short circuit preventing units is adhered to the top surface of an area where the positive electrode tab is formed.

4. The battery unit of claim 3, wherein:
    the one short circuit preventing unit has a width sufficient to cover both the positive electrode current collector and the area where the positive electrode tab is exposed, and
    the area ranges from the upper end of the positive electrode current collector to the lower end of the protective tape wrapped around the positive electrode tab.

5. The battery unit of claim 2, wherein one of the short circuit preventing units is provided in the positive uncoated area formed on the rear surface of the positive electrode current collector having the positive electrode tab.

6. The battery unit of claim 5, wherein:
    the one short circuit preventing unit has a width sufficient to cover both the positive electrode current collector and the area where the positive electrode tab is exposed, and
    the area ranges from the upper end of the positive electrode current collector to the lower end of the protective tape wrapped around the positive electrode tab.

7. The battery unit of claim 4, wherein the one short circuit preventing unit has a length sufficient to cover both one edge of the positive electrode current collector to a boundary between the positive electrode uncoated area and the positive electrode sheet such that the positive electrode sheet is disposed between the one short circuit preventing unit and the positive electrode current collector.

8. The battery unit of claim 6, wherein the one short circuit preventing unit has a length sufficient to cover both one edge of the positive electrode current collector to a boundary between the positive electrode uncoated area and the positive electrode sheet such that the positive electrode sheet is disposed between the one short circuit preventing unit and the positive electrode current collector.

9. The battery unit of claim 1, wherein:
    the negative electrode tab is fixedly welded to either a front surface or a rear surface of the negative uncoated areas, and
    an area where the negative electrode tab is exposed is formed between the negative tape wrapped around the negative electrode tab and the negative electrode current collector.

10. The battery unit of claim 9, wherein one of the short circuit preventing units is adhered to the top surface of an area where the negative electrode tab is formed.

11. The battery unit of claim 10, wherein:
the one short circuit preventing unit has a width sufficient to cover both the negative electrode current collector and the area where the negative electrode tab is exposed, and
the area ranges from the upper end of the negative electrode current collector to the lower end of the protective tape wrapped around the negative electrode tab.

12. The battery unit of claim 9, wherein one of the short circuit preventing units is formed on the negative electrode uncoated area formed on the rear surface of the negative electrode current collector having the negative electrode tab.

13. The battery unit of claim 10, wherein the one short circuit preventing unit has a length sufficient to cover both one edge of the negative electrode current collector to a boundary between the negative electrode uncoated area and the negative electrode sheet such that the negitive electrode sheet is disposed between the one short circuit preventing unit and the negative electrode current collector.

14. The battery unit of claim 12, wherein the one short circuit preventing unit has a length sufficient to cover both one edge of the negative electrode current collector to a boundary between the negative electrode uncoated area and the negative electrode sheet such the the negative electrode sheet is disposed between the one short circuit preventing unit and the negative electrode current collector.

15. The battery unit of claim 1, wherein the short circuit preventing units comprise insulating tapes made of polymer resins having heat resistance properties.

16. The battery unit of claim 1, wherein the short circuit preventing units comprise polyester.

17. A secondary battery comprising:
a battery unit having a positive electrode plate, a separator and a negative electrode plate sequentially disposed and then wound;
a positive electrode tab electrically connected to the positive electrode plate and having a protective tape wrapped around a portion protruding from the positive electrode plate;
a negative electrode tab selectively connected to the negative electrode plates and having a protective tape wrapped around a portion protruding from the negative electrode plate; and
a case having a space in which the battery unit is housed, wherein:
the positive electrode plate comprises a positive electrode current collector and a positive electrode sheet selectively formed on surfaces of the positive electrode current collector,
the negative electrode plate has a negative electrode current collector and a negative electrode sheet selectively formed on surfaces of the negative electrode current collector,
short circuit preventing units selectively formed on corresponding positive and negative electrode uncoated areas of the positive and negative electrode current collectors where the positive and negative electrode sheets are not formed, and
the short circuit preventing units each have widths relatively greater than widths of the corresponding positive and electrode current collectors so as to cover at least a portion of the corresponding protective tapes.

18. The secondary battery of claim 17, wherein:
the short circuit preventing units have widths sufficient to cover both the positive and negative electrode current collectors and areas where the positive and negative electrode tabs are exposed, and
the areas range from the upper ends of the positive and negative electrode current collector to the lower ends of the protective tapes wrapped around the positive and negative electrode tabs.

19. The secondary battery of claim 17, wherein the short circuit preventing units are insulating tapes made of polymer resin having heat resistance.

20. A secondary battery comprising:
a positive electrode plate having a positive electrode current collector and a positive electrode sheet formed on a surface of the positive electrode current collector;
a positive electrode tab extending from and connected to the positive electrode current collector;
a negative electrode plate having a negative electrode current collector and a negative electrode sheet formed on a surface of the negative electrode current collector;
a negative electrode tab extending from and electrically connected to the negative electrode current collector;
a protective tape at one of the positive and negative electrode tabs; and
at least one insulator at an area of one of the positive and negative electrode current collectors not coated by the corresponding positive and negative electrode sheets and which prevents short circuits, the at least one insulator having a surface covering at least a portion of either:
the protective tape such that the protective tape is between the surface and the corresponding one of the positive and negative electrode tabs, or
the corresponding electrode sheet such that the corresponding electrode sheet is between the surface and the corresponding current collector.

21. The secondary battery of claim 20, wherein the insulator covers the portion of both the protective tape and the corresponding electrode sheet.

22. The secondary battery of claim 21, wherein the insulator has an opening which exposes a portion of the area of the one current collector not coated by the corresponding electrode sheet.

23. The secondary battery of claim 20, wherein the insulator comprises an insulating tape.

24. The secondary battery of claim 23, wherein the insulating tape has a width greater than a width of the corresponding positive and negative electrode current collectors so as to cover the uncoated area.

25. The secondary battery of claim 23, wherein the insulator covers the portion of both the protective tape and the corresponding electrode sheet.

26. The secondary battery of claim 25, wherein the insulating tape covers the portion of the protective tape, and the insulator further comprises another tape which covers the corresponding electrode sheet so as to define an opening which exposes a portion of the area of the one current collector not coated by the corresponding electrode sheet.

27. The secondary battery of claim 20, wherein the protective tape is disposed apart from the corresponding positive and negative current collector such that the protective tape does not contact the corresponding current collector.

28. The battery unit of claim 1, wherein:
one of the electrode tabs is disposed at a corresponding one of the uncoated areas of the positive and negative electrode current collectors, and
at least one of the short circuit preventing units is disposed at the uncoated area such that the one electrode tab is disposed between the at least one short circuit preventing unit and the corresponding one uncoated area.

29. The battery unit of claim 28, wherein the one electrode tab has a length such that the electrode tab extends past an edge of the uncoated area, and the at least one short circuit preventing unit extends past the edge to cover a portion of the length disposed between the protective tape and the edge.

30. The battery unit of claim 28, wherein the at least one short circuit preventing unit has a surface covering at least a portion of:
the corresponding protective tape such that the protective tape is between the surface and the corresponding one electrode tab, or
the corresponding electrode sheet such that a corresponding one of the positive and negative electrode sheets is between the surface and the corresponding current collector and the surface extends past a boundary between the one electrode sheet and the uncoated area.

31. The battery unit of claim 30, wherein the at least one short circuit preventing unit covers the portion of both the protective tape and the corresponding electrode sheet.

32. The battery unit of claim 31, wherein the at least one short circuit preventing unit has an opening which exposes a portion of the uncoated area of the one current collector without exposing the corresponding electrode sheet and the corresponding electrode tab.

33. The battery unit of claim 30, wherein the at least one short circuit preventing unit has a width greater than a width of the corresponding positive and negative electrode current collectors so as to cover the uncoated area.

34. The battery unit of claim 33, wherein the at least one short circuit preventing unit covers the portion of both the protective tape and the corresponding electrode sheet.

35. The battery unit of claim 34, wherein the at least one short circuit preventing unit comprises an insulator which covers the portion of the protective tape, and another insulator which covers the corresponding electrode sheet so as to define an opening which exposes a portion of the area of the one current collector not coated by the corresponding electrode sheet.

36. The battery unit of claim 30, wherein the protective tape is disposed apart from the corresponding current collector such that the at least one short circuit preventing unit does not contact the corresponding current collector.

37. The battery unit of claim 17, wherein:
one of the electrode tabs is disposed at a corresponding one of the uncoated areas of the positive and negative electrode current collectors, and
at least one of the short circuit preventing units is disposed at the uncoated area such that the one electrode tab is disposed between the at least one short circuit preventing unit and the corresponding one uncoated area.

38. The secondary battery of claim 37, wherein the one electrode tab has a length such that the electrode tab extends past an edge of the uncoated area, and the at least one short circuit preventing unit extends past the edge to cover a portion of the length disposed between the protective tape and the edge.

39. The secondary battery of claim 37, wherein the at least one short circuit preventing unit has a surface covering at least a portion of:
the corresponding protective tape such that the protective tape is between the surface and the corresponding one electrode tab, or
the corresponding electrode sheet such that a corresponding one of the positive and negative electrode sheets is between the surface and the corresponding current collector.

40. The secondary battery of claim 39, wherein the at least one short circuit preventing unit covers the portion of both the protective tape and the corresponding electrode sheet.

41. The secondary battery of claim 40, wherein the at least one short circuit preventing unit has an opening which exposes a portion of the uncoated area of the one current collector without exposing the corresponding electrode sheet and the corresponding electrode tab.

42. The secondary battery of claim 40, wherein the at least one short circuit preventing unit has a width greater than a width of the corresponding positive and negative electrode current collectors so as to cover the uncoated area.

43. The secondary battery of claim 42, wherein the at least one short circuit preventing unit covers the portion of both the protective tape and the corresponding electrode sheet.

44. The secondary battery of claim 43, wherein the at least one short circuit preventing unit covers the portion of the protective tape, and the at least one short circuit preventing unit further comprises another tape which covers the corresponding electrode sheet so as to define an opening which exposes a portion of the area of the one current collector not coated by the corresponding electrode sheet.

45. The secondary battery of claim 39, wherein the protective tape is disposed apart from the corresponding current collector such that the protective tape does not contact the corresponding current collector.

* * * * *

UNITED STATES PATENT AND TRADEMARK OFFICE
CERTIFICATE OF CORRECTION

PATENT NO. : 7,033,697 B2 Page 1 of 1
APPLICATION NO. : 10/214557
DATED : April 25, 2006
INVENTOR(S) : Sang-Mok Park et al.

It is certified that error appears in the above-identified patent and that said Letters Patent is hereby corrected as shown below:

Column 13, line 41, change "selectively" to --electrically--.

Column 13, line 42, change "plates" to --plate--.

Signed and Sealed this

Twenty-first Day of November, 2006

JON W. DUDAS
*Director of the United States Patent and Trademark Office*